(12) United States Patent
Ashelin et al.

(10) Patent No.: US 6,502,268 B2
(45) Date of Patent: Jan. 7, 2003

(54) WEATHER SHIELD FOR BELOW A DOCK LEVELER

(75) Inventors: Charles J. Ashelin, Dubuque, IA (US); Charles J. Digmann, Cuba City, WI (US); Gregory J. Thill, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/837,092

(22) Filed: Apr. 18, 2001

(65) Prior Publication Data

US 2002/0152562 A1 Oct. 24, 2002

(51) Int. Cl.⁷ .................................................. E01D 1/00
(52) U.S. Cl. .......................................... 14/71.1; 14/69.5
(58) Field of Search ................................ 14/69.5, 71.1, 14/71.5

(56) References Cited

U.S. PATENT DOCUMENTS

| | | | | |
|---|---|---|---|---|
| 4,110,860 A | * | 9/1978 | Neff et al. ..................... | 14/71.7 |
| RE30,254 E | * | 4/1980 | Rasmussen .................. | 160/120 |
| 4,286,410 A | | 9/1981 | Hahn | |
| 4,293,969 A | * | 10/1981 | Frommelt .................... | 114/263 |
| 4,349,992 A | | 9/1982 | Layne | |
| 4,422,199 A | * | 12/1983 | Frommelt .................... | 14/71.1 |
| 4,557,008 A | | 12/1985 | Jurden | |
| 4,682,382 A | * | 7/1987 | Bennett ....................... | 14/71.3 |
| 5,042,103 A | | 8/1991 | Megens | |
| 5,396,676 A | | 3/1995 | Alexander et al. | |
| 5,442,825 A | | 8/1995 | Hahn et al. | |
| 5,542,463 A | * | 8/1996 | Pinkalla et al. .......... | 160/121.1 |
| 6,145,571 A | * | 11/2000 | Snyder .......................... | 160/1 |
| 6,240,587 B1 | * | 6/2001 | Meichtry et al. ............ | 14/69.5 |

FOREIGN PATENT DOCUMENTS

NL         7707810         1/1979

OTHER PUBLICATIONS

Roller Seal for Scissors Lift Rite Hite 9/1996.
Otco Inc. Web–page of Roller Curtain Lift Guards (circa Nov. 2001).

* cited by examiner

Primary Examiner—Gary S. Hartmann
(74) Attorney, Agent, or Firm—Marshall, Gerstein & Borun (57) ABSTRACT

An extendible shield for sheltering the pit area below a dock leveler of a loading dock. The shield is especially suited for dock levelers having a ramp of pivotally adjustable height with a lip extension for providing a traffic path between the rear of a vehicle and a loading dock platform. The shield includes a curtain wrapped around a roller, which provides the shield with a vertical span that can vary to match the up and down movement of the ramp. Various embodiments include features such as a flexible seal that seals against the rear of a vehicle and cutouts for accommodating a vehicle restraint and lip keepers.

9 Claims, 9 Drawing Sheets

WEATHER SHIELD FOR BELOW A DOCK LEVELER

BACKGROUND OF THE INVENTION

1. Field of the Invention

The subject invention generally pertains to loading docks, and more specifically to a shield system for shielding an area below a dock leveler.

2. Description of Related Art

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck, also known as a ramp or dockboard, which is pivotally hinged along its back edge to vary the height of its front edge. An extension plate, or lip, extends outward from the deck's front edge to span the gap between the rear of the truck bed and the front edge of the deck. The lip is usually moveable between a stored position to an extended, operative position. In the extended, operative position, the lip extends from the deck's front edge and rests upon the truck bed to form a bridge between the two. This allows personnel and material handling equipment to readily move on and off the vehicle during loading and unloading operations.

To help shield against weather while a vehicle is being serviced at the dock, usually some type of seal is installed around the perimeter of the doorway. Such seals are usually installed along the upper and side edges of the doorway to help seal any air gaps that may otherwise exist between the face of the building and the rear of the vehicle. The dock leveler lip resting upon the rear of the vehicle is often relied upon to seal most of the doorway's lower edge.

However, the area or pit underneath a dock leveler's ramp is usually exposed to outside air. This can create problems, especially when there is a significant temperature differential between the indoor and outdoor air. For example, warm outside air may condense underneath a relatively cool ramp of a dock leveler used in a cold storage warehouse. The condensation can promote corrosion of various parts of the dock leveler. Conversely, a heated building during the winter may loose a significant amount of heat by thermal conduction through the ramp, as cold outside air cools the ramp from underneath. Thus, regardless of whether the outside air is colder or warmer than the inside air, it may be beneficial to shield the underside of a dock leveler from outside air, as proposed in U.S. Pat. No. 4,682,382.

The '382 patent suggests using a rectangular panel to help shield the area underneath a dock leveler. A lower edge of the panel is coupled to the dock, while the panel's upper edge has a resilient sealing strip for sealing against the rear of a vehicle. The effectiveness of that seal, however, may depend on how squarely a vehicle backs into the dock and may further depend on the shape or contour of the vehicle's rear surface. Moreover, in the absence of a vehicle, it appears that the dock leveler lip, rather than the rectangular panel, is relied upon to shield the underside of the ramp from the outside air. Also, to move the lip from a stored, pendant position to an extended, operative position, the ramp apparently must lift the lip up and over the upper edge of the panel before the lip can be set back down atop the truck bed. As the lip travels over the top of the sealing strip, the underside of the ramp may be momentarily exposed to an inrush of outside air.

SUMMARY OF THE INVENTION

To help shield a pit area below a dock leveler, a shield system includes a shield having a lower edge adjacent the pit area and an upper edge coupled to the ramp. The upper edge moves with the ramp, while the lower edge remains below the dock. Thus, the shield provides a weather-shielding span whose vertical length varies with movement of the ramp.

In some embodiments, the vertical length of the weather-shielding span varies by virtue of a roller about which the shield is wrapped.

In some embodiments, the upper edge of the shield can be coupled to the ramp by being attached to a dock leveler's lip extension.

In some embodiments, the upper edge of the shield can be coupled to the ramp by being attached directly to the ramp.

In some embodiments, the upper edge of the shield can be coupled to the ramp by being attached to a hinge that connects the lip extension to the ramp.

In some embodiments, the shield includes notched out areas to accommodate various loading dock related items such as a vehicle restraint or lip keepers.

In some embodiments, the shield includes a compliant seal capable of sealing against the rear of a vehicle.

In some embodiments, a shield includes several loops of fabric to create a seal that is compliant without the drawbacks of foam. Foam generally has relatively low wear resistance and tends to absorb moisture and hold dirt.

DESCRIPTION OF THE PREFERRED EMBODIMENT

Figure 1:
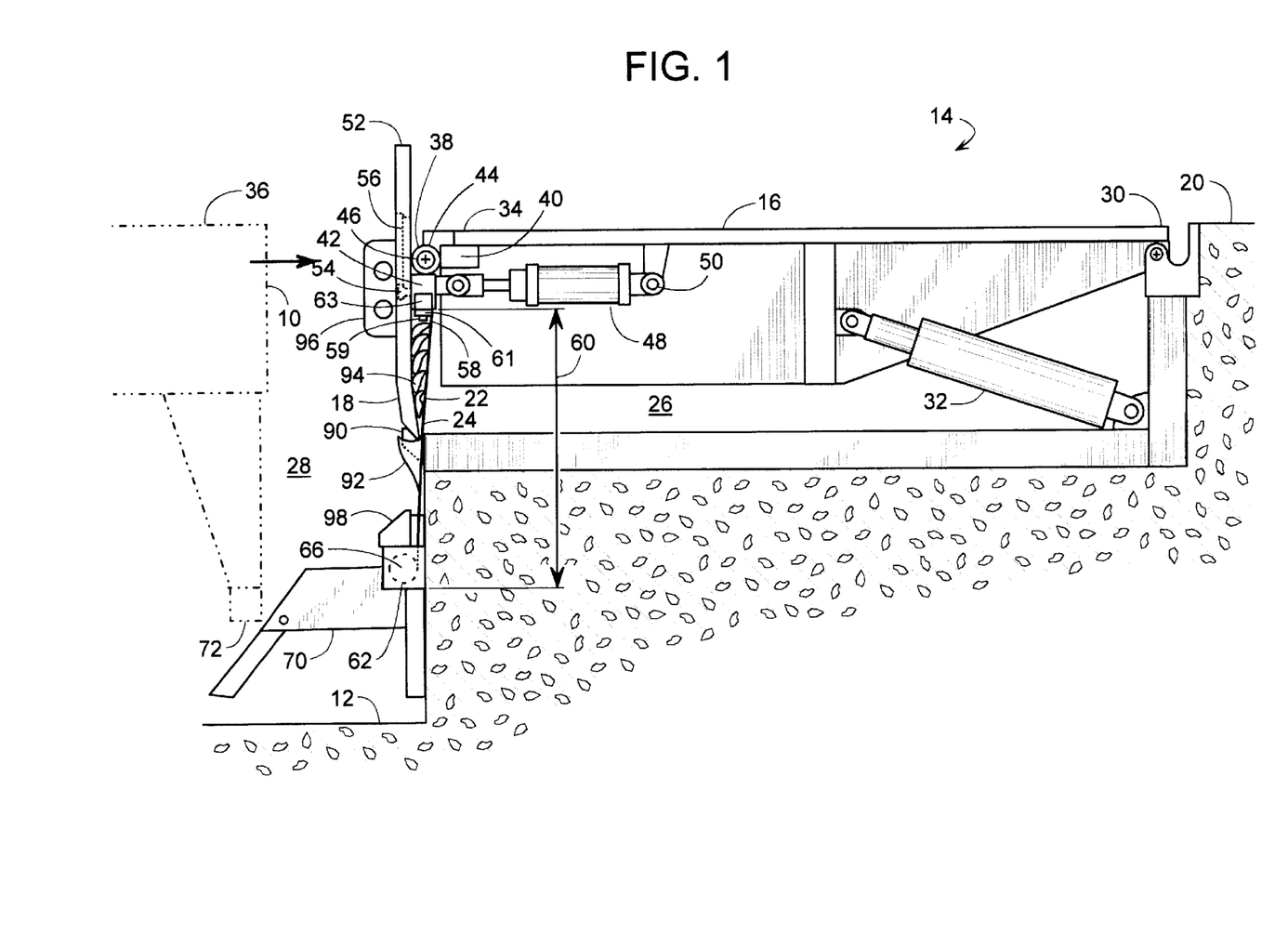
FIG. 1 is a side view of a dock leveler with portions removed to show a weather shield that helps shelter an area below the dock leveler.

FIG. 1 shows a vehicle 10, such as a truck or trailer, backing into a loading dock 12. Once vehicle 10 is parked and in position to be loaded or unloaded of its cargo, a dock leveler 14 moves its ramp 16 and lip extension 18 through their positions of FIGS. 1, 2 and 3 sequentially to create a traffic path between vehicle 10 and a platform 20 of dock 12. Whether dock leveler 14 is at its stored position of FIG. 1, an intermediate position of FIG. 2, or at its operative position of FIG. 3, a shield system 22 having a flexible shield, such as a curtain 24, helps shelter an area 26 underneath ramp 16 from outside air 28.

Although the actual structure of dock leveler 14 may vary, in some embodiments, ramp 16 is hinged along a rear edge 30. This allows an actuator 32, such as a hydraulic cylinder, to pivotally adjust the height of a front edge 34 of ramp 16, so edge 34 can be placed at approximately the same height as the truck or trailer bed 36 of vehicle 10.

Figure 3:
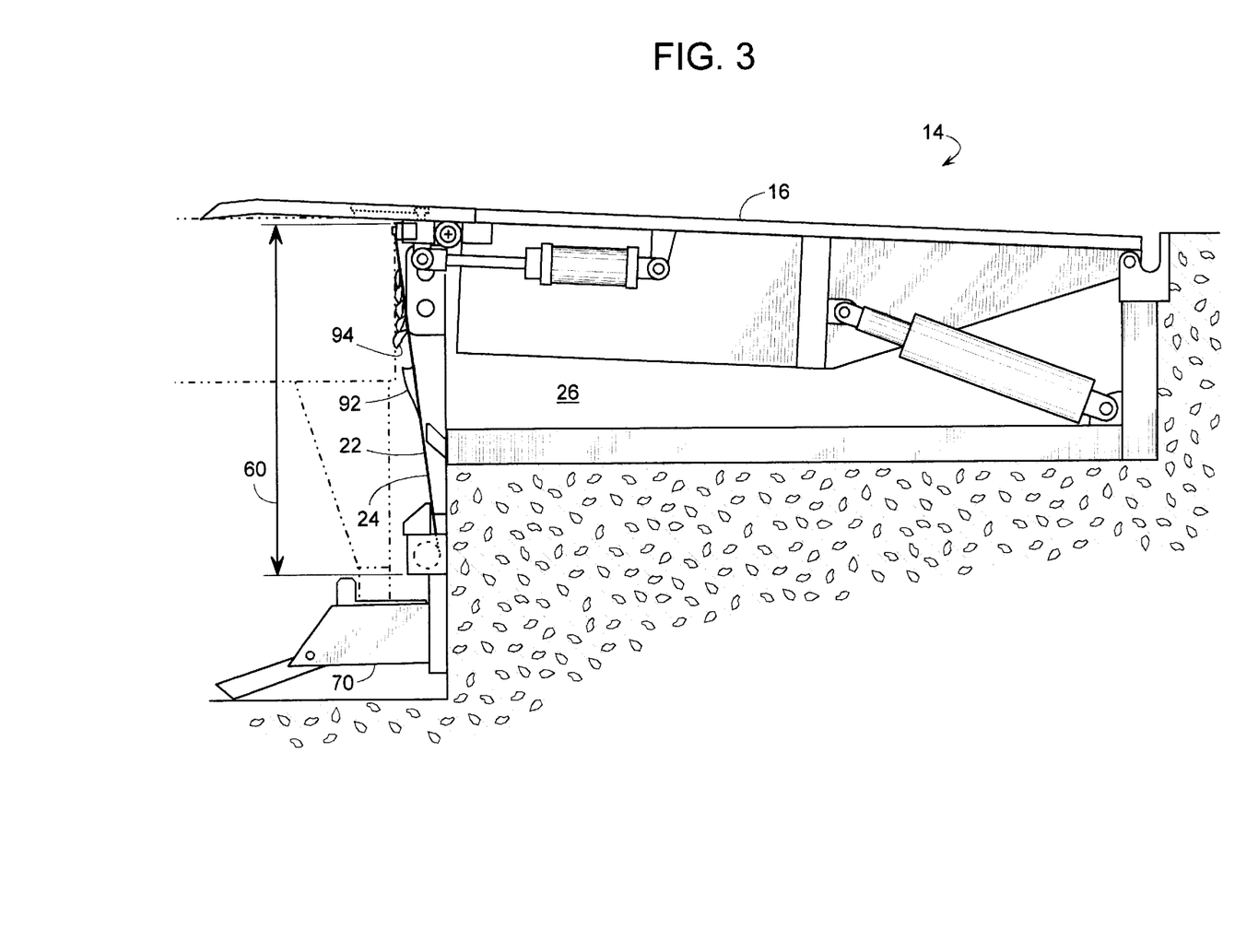
FIG. 3 is similar to FIG. 1, but with the dock leveler in an operative position.

To bridge the gap between front edge 34 and the rear of vehicle 10, lip 18 is coupled to edge 34 for movement between a stored position (FIG. 1), and an extended, operative position (FIG. 3). Lip 18 is schematically illustrated to represent the wide variety of lip extensions that are known to those skilled in the art. One example of lip 18 is disclosed in U.S. Pat. No. 4,920,598, which is specifically incorporated by reference herein. Even though in some embodiments lip 18 both pivots and translates in moving between its stored and operative positions, other lip extensions that only pivot or only translate are also well within the scope of the invention.

In some cases, the pivotal motion of lip 18 is provided by a hinge 38 having one series of leaf segments 40 attached to front edge 34 of ramp 16 and another series of leaf segments 42 staggered axially relative to segments 40 and coupled to lip 18. Segments 40 and 42 are welded to alternate spools 44 that allow relative rotational movement about a central hinge pin 46. An actuator 48 (e.g., hydraulic, pneumatic, mechanical, electrical, etc.) between one of the lip segments 42 and a fixed point 50 on ramp 16 is able to extend and retract to pivot lip 18 about pin 46.

Figure 5:
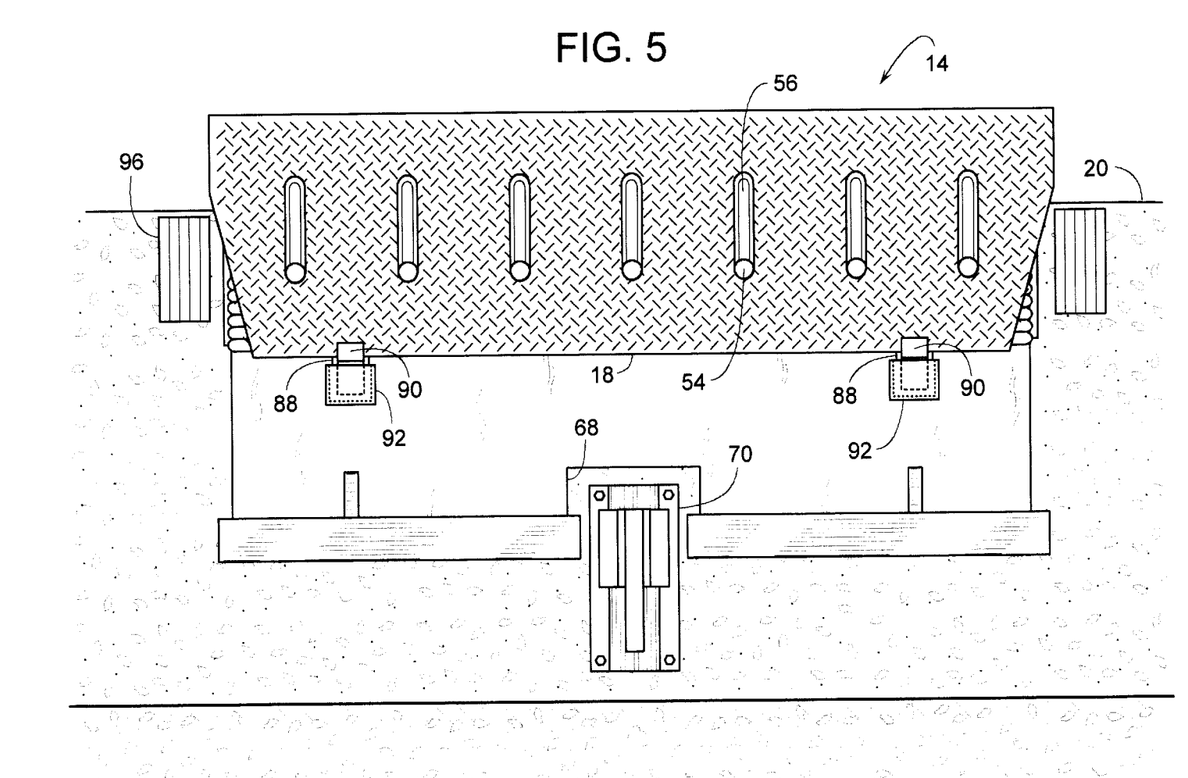
FIG. 5 is a front view of FIG. 1.

Translation of lip 18 allows a rear edge 52 of lip 18 to protrude above ramp 16 when dock leveler 14 is in its stored position of FIG. 1. This offers the benefit of having an obstruction that helps prevent material handling equipment from accidentally driving off the front edge of ramp 16 when lip 18 in not engaging a vehicle. Relative translation between lip 18 and ramp 16 can be provided by attaching a stud 54 to each hinge segment 42 (i.e., the segments that pivot with lip 18), and having a head of each stud 54 slide within a slot 56 of lip 18, as shown in FIG. 5.

Figure 4:
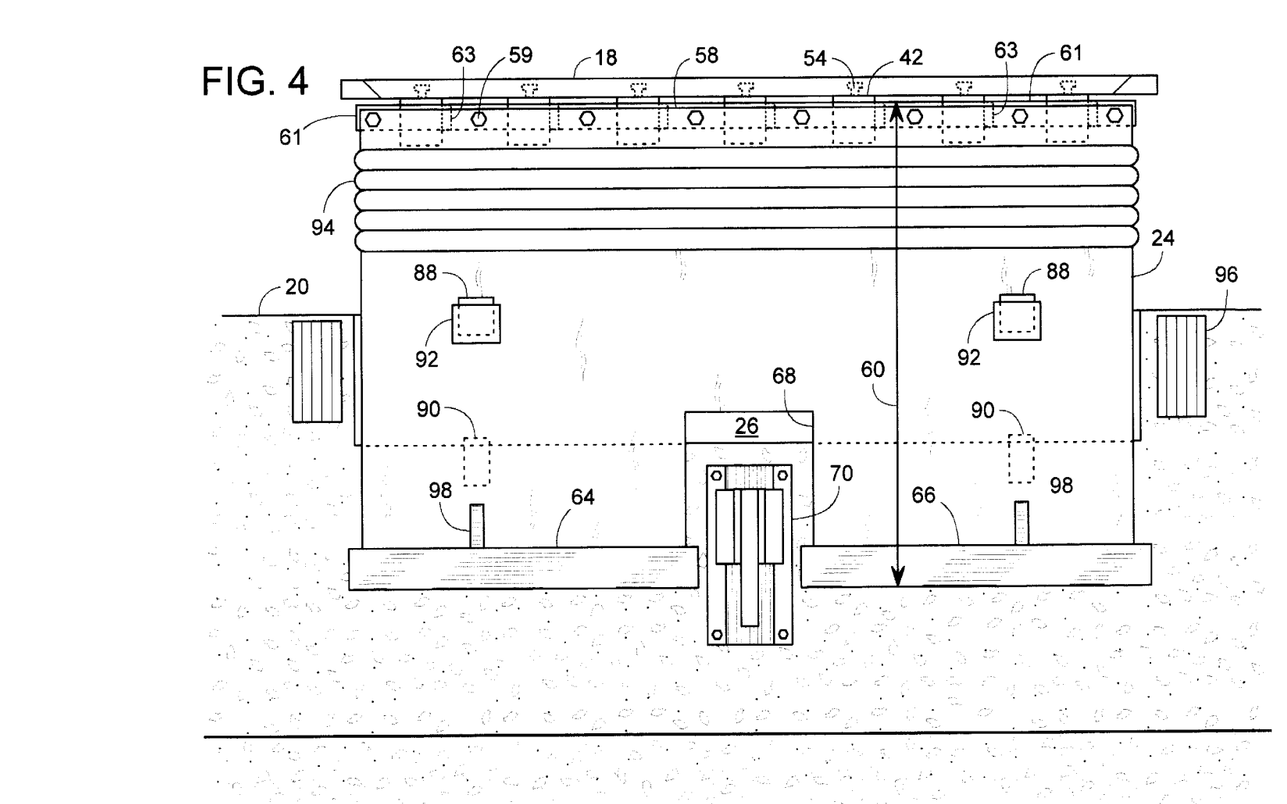
FIG. 4 is a front view of FIG. 2.

Hinge segments 42 also provide a convenient location to couple an upper edge 58 of curtain 24 to ramp 16. For example, in some embodiments, screws 59 attach curtain 24 to a metal strip 61 that is mounted to hinge segments 42, as shown in FIG. 4. To attach strip 61 to segments 42, a series of tabs 63 extending from the backside of strip 61 can be welded to segments 42.

The structure of curtain 16 or its method of mounting is preferably such that curtain 24 provides a weather-shielding span 60 whose vertical length varies with movement of ramp 16. One way of accomplishing this is to wrap a lower edge 62 of curtain 24 around at least one roller. In some cases, lower edge 62 of curtain 24 is preferably held by two rollers 64 and 66 with a lower central portion of curtain 24 defining a notch 68 that fits around a vehicle restraint 70, as shown in FIGS. 4 and 5. Vehicle restraint 70 can be used to engage a rear impact guard 72 of vehicle 10 to help prevent vehicle 10 from accidentally pulling away form dock 12. Restraint 70 is schematically illustrated to represent the wide variety of vehicle restraints that are known to those skilled in the art. One example of restraint 70 is disclosed in U.S. Pat. No. 6,116,839, which is specifically incorporated by reference herein.

Figure 6:
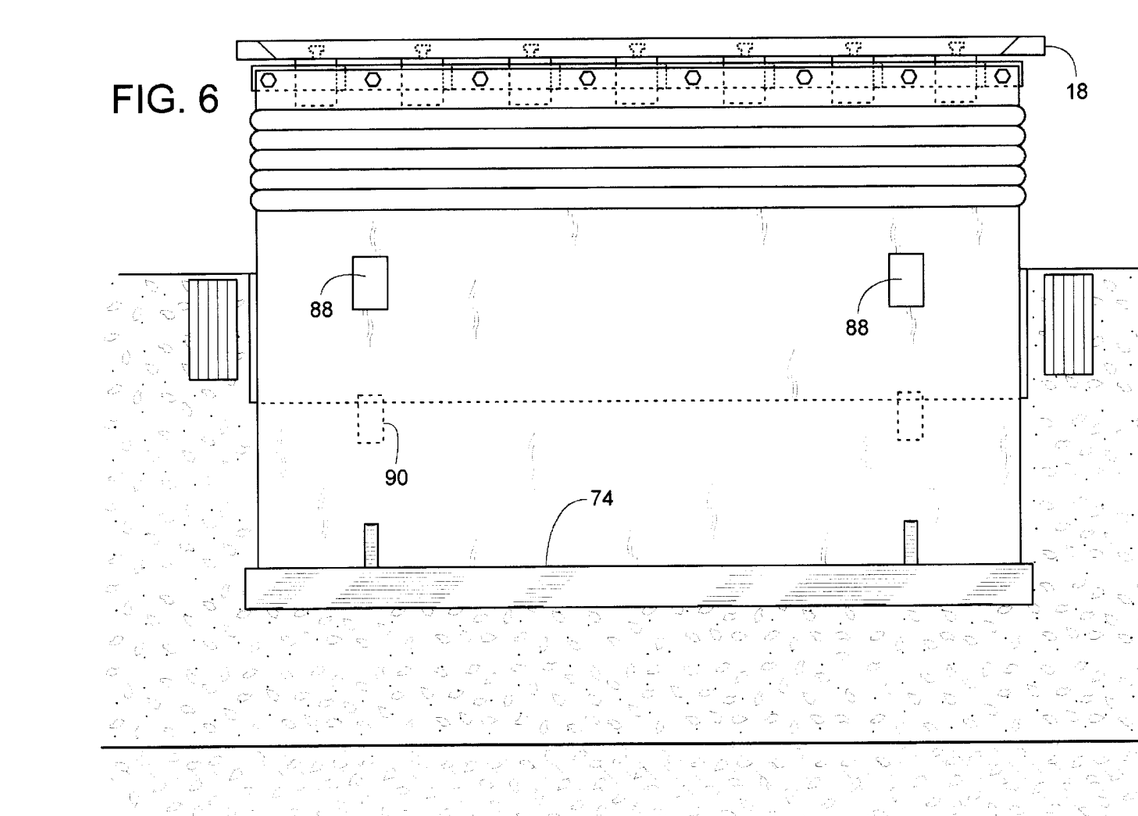
FIG. 6 is similar to FIG. 5, but showing another embodiment of a dock leveler shield.

By using a roller, then, as front edge 34 of ramp 16 rises, the roller (or rollers) pays out curtain 24 to maintain an appreciable amount of weather-shielding coverage in front of pit area 26. Providing the rollers with a spring return helps keep curtain 24 taut and allows the rollers to automatically take up curtain 24 as ramp 16 descends. An example of a two-roller system with a vehicle restraint is illustrated in FIGS. 4 and 5, and an example of a single roller 74 without a vehicle restraint is shown in FIG. 6.

Figure 7:
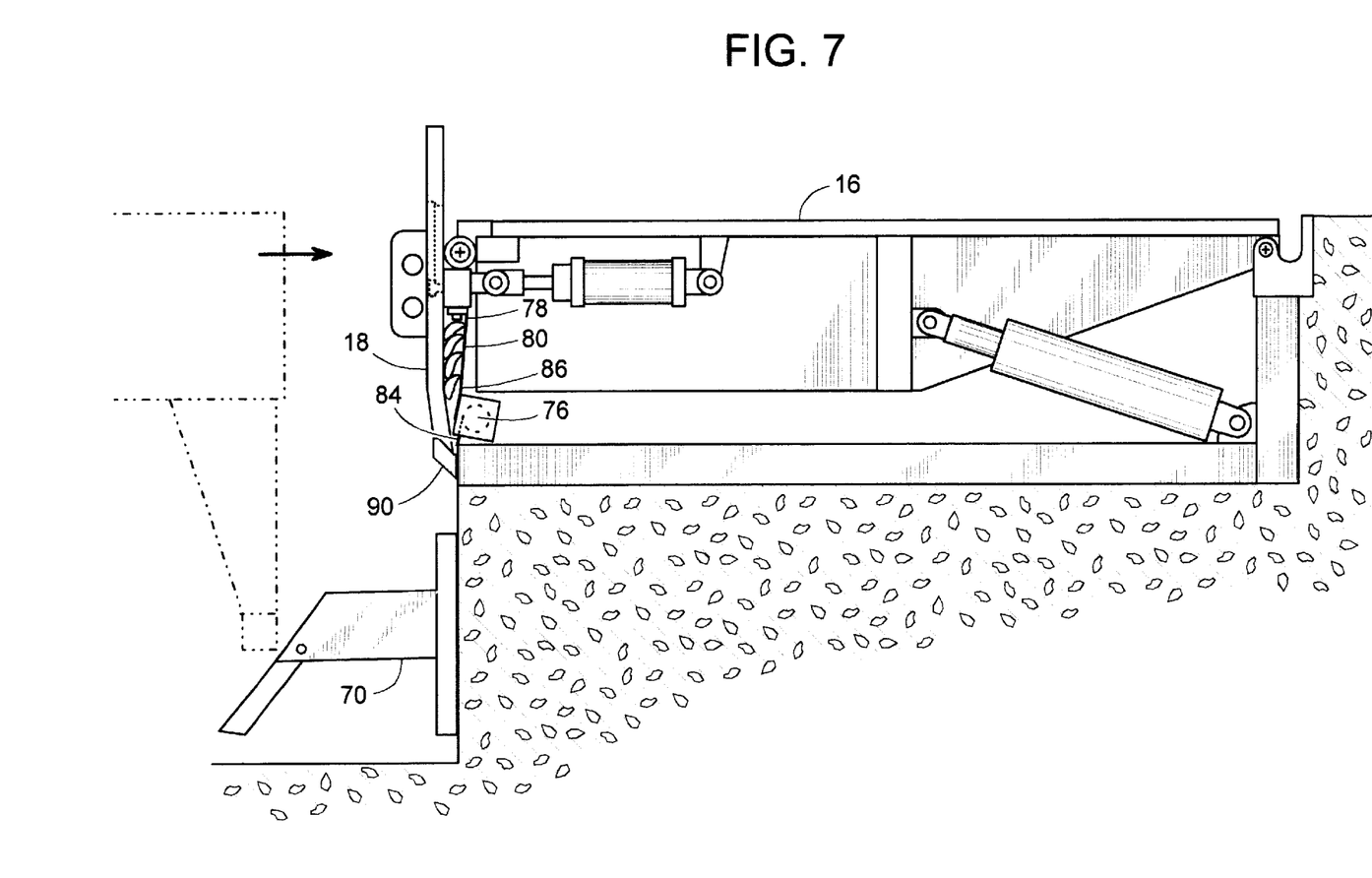
FIG. 7 is similar to FIG. 1, but showing yet another embodiment of a dock leveler shield.
Figure 8:
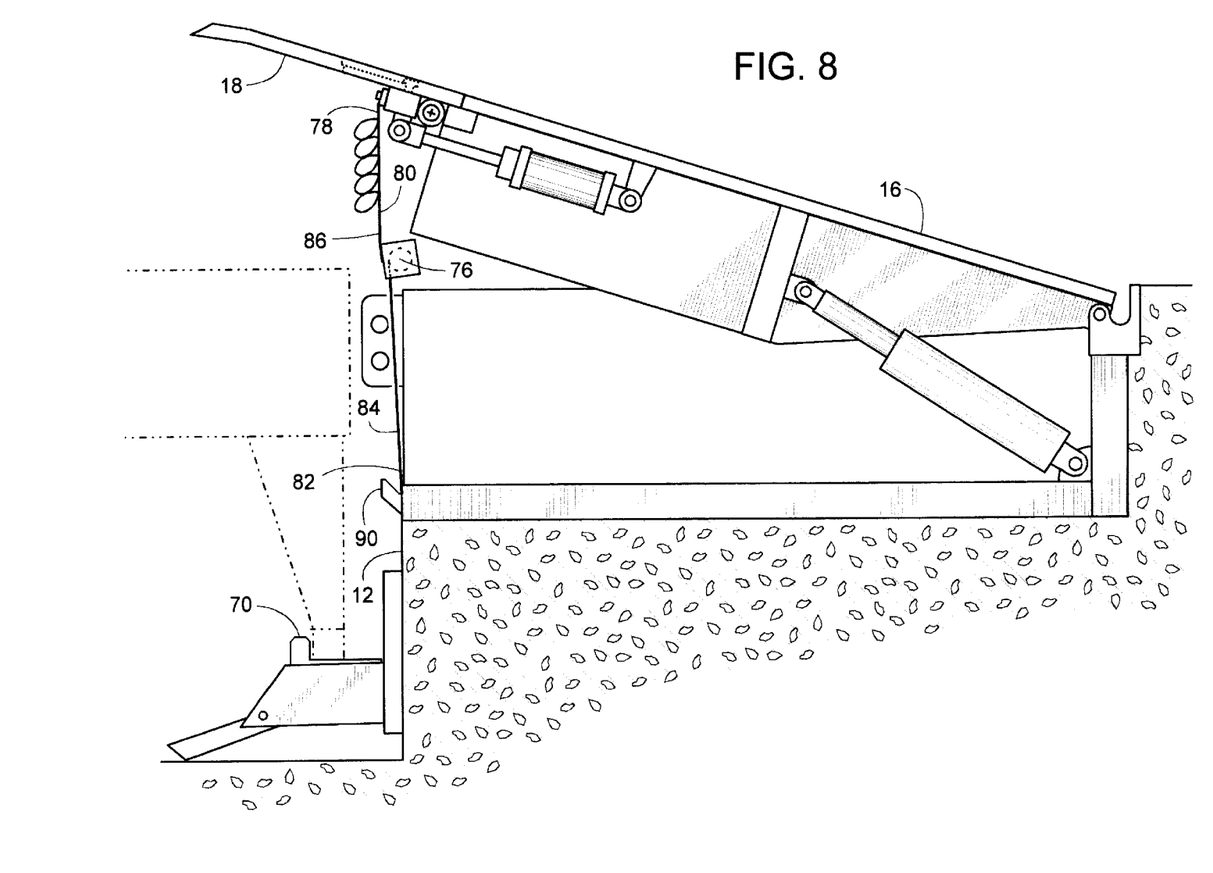
FIG. 8 shows the dock leveler shield of FIG. 7, but with the dock leveler in a raised position.

However, it should be appreciated that with some rearrangement of the components, a single roller 76 with a vehicle restraint is also well within the scope of the invention. If space permits, roller 76 can be mounted anywhere between an upper surface of ramp 16 and a lower surface of pit area 26. For example, in FIGS. 7 and 8, roller 76 is mounted at an intermediate position between an upper edge 78 of a curtain segment 80 and a lower edge 82 of curtain 84. A lower edge 86 of curtain segment 80 is attached to a housing of roller 76, and an upper edge of curtain 84 wraps around roller 76. Lower edge 82 of curtain 84 is mounted just above vehicle restraint 70. With this arrangement, the housing of roller 76 is sheltered behind the curtain and a cutout for vehicle restraint 70 may not be needed.

In some cases, curtain 24 may include openings 88 to accommodate what is known as lip keepers 90. Lip keepers 90 engage a lower edge of lip 18 to help support the weight of lip 18 and ramp 16 when dock leveler 14 is in its stored position of FIGS. 1 and 5. To maximize the curtain's ability to shield against outside air, fabric flaps 92 may be installed over at least a portion of holes 88. Such flaps can be attached to curtain 24 along any edge of holes 88, or may simply be the result of only cutting partially around the perimeter of holes 88 (analogous to a hanging chad). However, holes 88 without flaps can be used, as shown in FIG. 6. And if a curtain is mounted above the lip keepers, as in FIGS. 7 and 8, such holes may not be needed.

To minimize drafts that may blow up from underneath lip 18, a resilient seal 94 can be installed along upper edge 58 of curtain 24. Seal 94 preferably seals against the rear of vehicle 10, as vehicle 10 backs up against a dock bumper 96. Seal 94 is schematically illustrated to encompass a wide variety of resilient seals including, but not limited to, foam, flexible panels, and brushes. In some embodiments, seal 94 is a series of fabric loops sewn or otherwise attached to curtain 24. The fabric used for seal 94 can be the same as that used for curtain 24, or may be of a completely different material. Some examples of materials that can be used for curtain 24 or seal 94 include, but are not limited to, vinyl; canvas duck; rubber impregnated fabric; nylon; and HYPALON, which is a registered trademark of Dupont.

Figure 2:
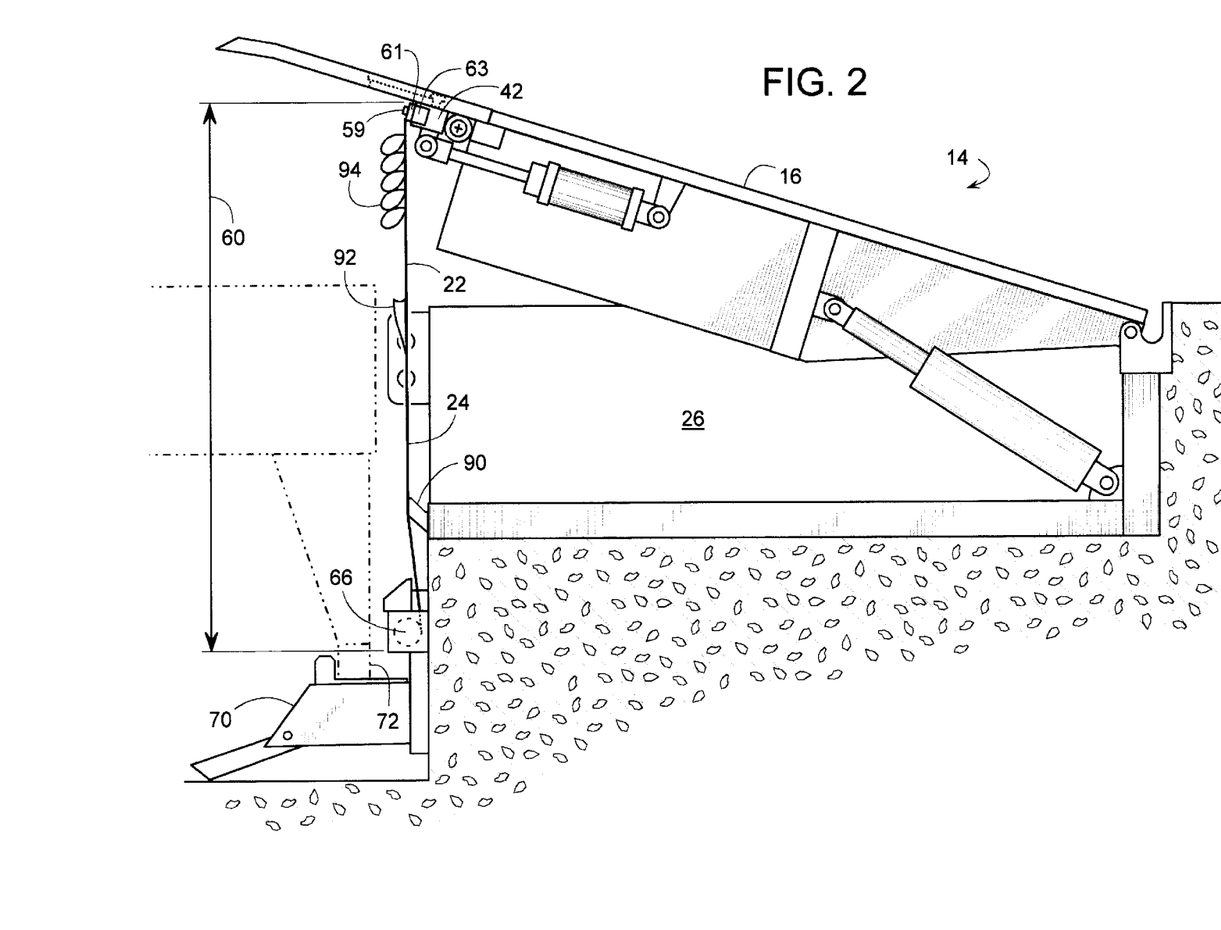
FIG. 2 is similar to FIG. 1, but with the dock leveler in a raised position.

A typical operating sequence begins with dock leveler 14 in the stored position, as shown in FIG. 1. Ramp 16 is generally flush with platform 20, and lip keepers 90 support lip 18 in its generally vertical position. As vehicle 10 backs against bumpers 96 of dock 12, vehicle restraint 70 engages the vehicle's rear impact guard 72. To place lip 18 atop the bed of vehicle 10, actuator 32 first lifts ramp 18, and actuator 48 then extends lip 18, as shown in FIGS. 2 and 4. As ramp 16 rises, rollers 64 and 66 pay out curtain 24 to help keep pit area 26 sheltered. Next, ramp 16 descends to place the extended lip 18 down against the bed of vehicle 10. Upon doing so, rollers 64 and 66 draw in curtain 24, and seal 94 seals against the rear surface of vehicle 10. Vehicle 10, restraint 70, and dock leveler 14 are now in a position for most loading or unloading operations, as shown in FIG. 3.

Figure 9:
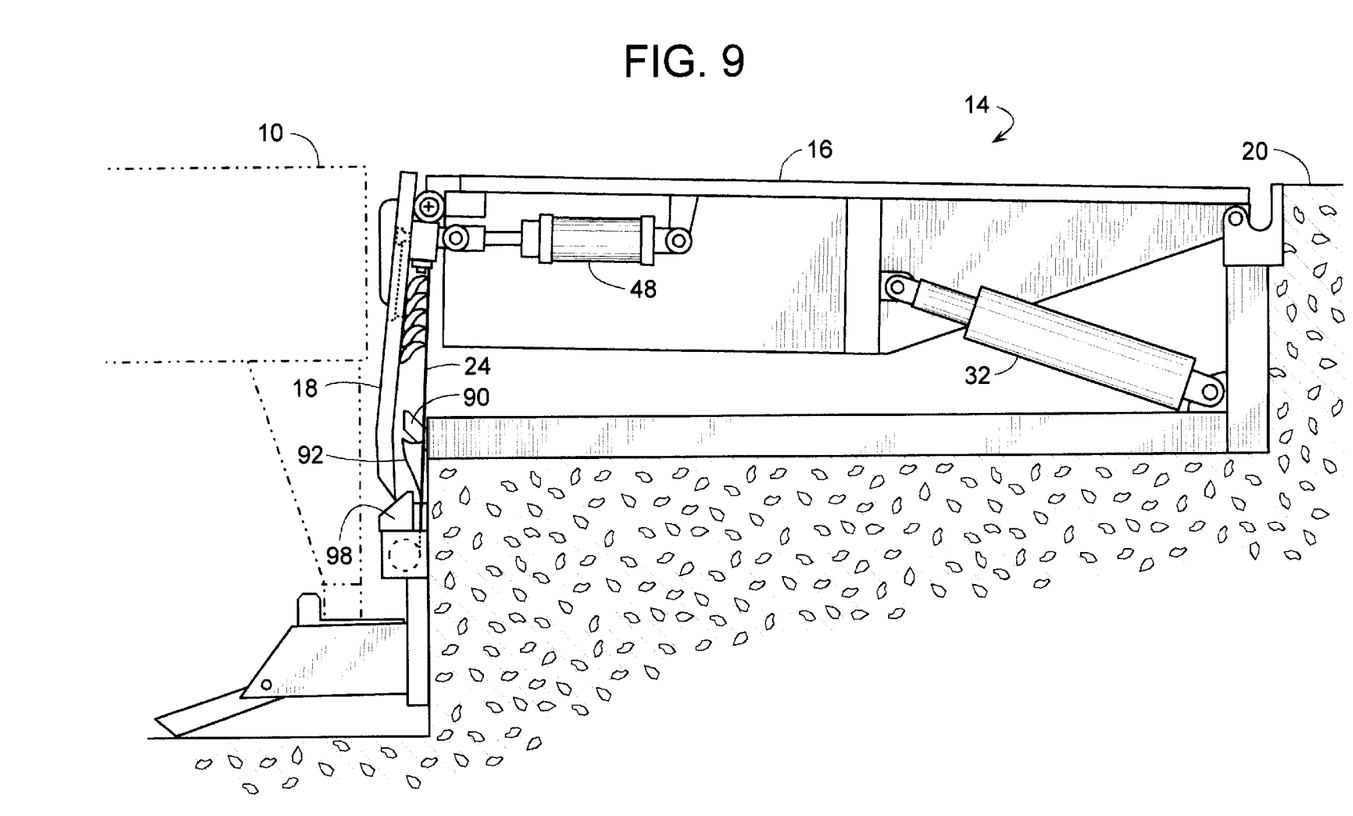
FIG. 9 shows the dock leveler and shield of FIG. 1 in an end loading position.

However, lip 18 overlaying vehicle 10 may interfere with placing or removing cargo from the very end of the vehicle. So, for some end loading operations, lip 18 may need to be removed from vehicle 10, and ramp 16 may need to be lowered below platform 20 (known as "below dock operation"). A forklift truck operating on ramp 16 may then extend its forks to place or remove the last load from vehicle 10. In placing leveler 14 in below dock operation, ramp 16 lowers lip 18 below lip keepers 90. To do this, actuator 48 needs to slightly extend lip 18 so the lower edge of lip 18 misses keepers 90 as ramp 16 descends, as shown in FIG. 9.

To prevent lip 18 from striking and thus damaging the roller housing during below dock operations, a sturdy wedge 98 installed above rollers 64 and 66 can be used to guide the lower edge of lip 18 around the roller housing.

Upon completing the loading or unloading of vehicle 10, lip actuator 48 allows lip 18 to hang pendant, and ramp actuator 32 moves ramp 16 first up and then back down to place the pendant lip 18 back into lip keepers 90, as shown in FIG. 1.

Although the invention is described with respect to a preferred embodiment, modifications thereto will be apparent to those skilled in the art. Therefore, the scope of the invention is to be determined by reference to the claims, which follow.

We claim:

1. A shield system for shielding an area of a pit below a pivotal ramp of a dock leveler, the shield system comprising: a curtain having an upper edge adapted to be disposed adjacent the pivotal ramp and a lower edge extending beneath a floor of the pit, wherein the upper edge and the lower edge define a weather-shielding span whose length varies by virtue of a roller attached to the curtain.

2. The shield system of claim 1, wherein the upper edge is coupleable to the pivotal ramp.

3. The shield system of claim 1, wherein the lower edge is wrapped around the roller.

4. The shield system of claim 1, wherein the curtain is wrapped around two rollers.

5. The shield system of claim 1, further comprising a resilient seal attached to the curtain adjacent the upper edge.

6. The shield system of claim 5, wherein the resilient seal includes a fabric loop.

7. The shield system of claim 1, wherein the dock leveler is adjacent a vehicle restraint mounted adjacent the pit, the vehicle restraint extending above the lower edge.

8. The shield system of claim 7, wherein the curtain defines an opening at the lower edge, the opening wrapping around the vehicle restraint.

9. A shield system for shielding an area underneath a pivotal ramp of a dock leveler having a lip coupled to the pivotal ramp and disposed in a pendant position when the dock leveler is in a lowered position, the shield system comprising: a flexible shield having an upper edge adapted to be disposed adjacent the pivotal ramp and a lower edge adjacent a roller and disposed below a distal end of the lip when the lip is in the pendant position, wherein the upper edge and the lower edge define a weather-shielding span having a length that varies with vertical movement of the upper edge;

wherein the flexible shield is wrapped around a roller;

wherein the lower edge is wrapped around the roller;

and wherein the shield system further compromises a wedge adapted to be engaged by the lip and being disposed adjacent the roller at a location that allows the wedge to help guide the lip past the roller, whereby the wedge helps protect the roller from being damaged by the lip.

* * * * *

UNITED STATES PATENT AND TRADEMARK OFFICE
CERTIFICATE OF CORRECTION

PATENT NO. : 6,502,268 B2
DATED : January 7, 2003
INVENTOR(S) : Ashelin et al.

It is certified that error appears in the above-identified patent and that said Letters Patent is hereby corrected as shown below:

<u>Title page,</u>
Item [57], ABSTRACT,
Lines 1-2, please delete "An extendible shield for sheltering the pit area below a dock leveler of a loading dock." and insert -- An extendible shield helps shelter the pit area below a dock leveler of a loading dock. --.
Lines 5-6, please delete "The shield includes a curtain wrapped around a roller," and insert -- In some embodiments, the shield includes a curtain wrapped around a roller, --.

<u>Column 3,</u>
Line 31, please delete "when lip 18 in not engaging a vehicle" and insert
-- when lip 18 is not engaging a vehicle --.
Line 53, please delete "from accidentally pulling away form dock 12" and insert
-- from accidentally pulling away from dock 12--.

Signed and Sealed this

Ninth Day of March, 2004

JON W. DUDAS
*Acting Director of the United States Patent and Trademark Office*